United States Patent
Ishizaki

(10) Patent No.: US 11,188,454 B2
(45) Date of Patent: Nov. 30, 2021

(54) REDUCED MEMORY NEURAL NETWORK TRAINING

(71) Applicant: INTERNATIONAL BUSINESS MACHINES CORPORATION, Armonk, NY (US)

(72) Inventor: Kazuaki Ishizaki, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 32 days.

(21) Appl. No.: 16/363,461

(22) Filed: Mar. 25, 2019

(65) Prior Publication Data
US 2020/0310955 A1 Oct. 1, 2020

(51) Int. Cl.
*G06F 12/02* (2006.01)
*G06N 3/08* (2006.01)
*G06F 16/901* (2019.01)

(52) U.S. Cl.
CPC ...... *G06F 12/0223* (2013.01); *G06F 12/0238* (2013.01); *G06F 16/9024* (2019.01); *G06N 3/08* (2013.01)

(58) Field of Classification Search
CPC .... G06F 3/0659; G06F 9/3836; G06F 9/4881; G06F 1/329; G06F 12/0223; G06F 12/0238; G06F 16/9024
See application file for complete search history.

(56) References Cited

U.S. PATENT DOCUMENTS

| | | | | | |
|---|---|---|---|---|---|
| 5,406,476 | A | * | 4/1995 | Deziel, Jr. ............... | G06Q 10/06 705/7.15 |
| 5,448,737 | A | * | 9/1995 | Burke ...................... | G06F 8/433 717/146 |
| 5,761,417 | A | * | 6/1998 | Henley .................... | G06F 3/061 709/231 |
| 6,195,701 | B1 | * | 2/2001 | Kaiserswerth .......... | G06F 16/40 709/231 |
| 8,561,001 | B1 | * | 10/2013 | Goel ....................... | G06F 30/394 716/130 |
| 2011/0238948 | A1 | * | 9/2011 | Vorbach .............. | G06F 9/30047 712/15 |

(Continued)

OTHER PUBLICATIONS

A Dynamic Slack Management Technique for Real-Time Distributed Embedded System with Enhanced Fault Tolerance and Resource Constraints by Baskaran (Year: 2011).*

(Continued)

*Primary Examiner* — Paul M Knight
(74) *Attorney, Agent, or Firm* — Tutunjian & Bitetto, P.C.; Randall Bluestone

(57) ABSTRACT

Methods and systems for training a neural network include determining a graph representation of a set of neural network training operations based on definition-use chains. A memory allocation queue is determined based on a slack value for each neural network training operation in the graph representation. Memory for each neural network training operation in the memory allocation queue is allocated. Execution of neural network training operations with non-zero slack is delayed to minimize an amount of memory allocated at any one time. Neural network training is executed using the allocated memory for each neural network training operation.

19 Claims, 10 Drawing Sheets

(56) References Cited

U.S. PATENT DOCUMENTS

| | | | | |
|---|---|---|---|---|
| 2014/0059551 | A1* | 2/2014 | Esan | H04L 67/1097 718/102 |
| 2015/0052298 | A1* | 2/2015 | Brand | G11C 15/00 711/108 |
| 2015/0363294 | A1* | 12/2015 | Carback, III | G06F 8/37 717/132 |
| 2016/0299991 | A1* | 10/2016 | Hong | G06F 16/2246 |
| 2016/0322042 | A1 | 11/2016 | Vlietinck et al. | |
| 2018/0285736 | A1 | 10/2018 | Baum et al. | |
| 2019/0005407 | A1* | 1/2019 | Harris | G06N 3/088 |
| 2019/0286991 | A1* | 9/2019 | Lee | G06N 3/063 |
| 2019/0303024 | A1* | 10/2019 | Iwai | G06F 3/0679 |

OTHER PUBLICATIONS

Dynamic Slack Reclamation with Procrastination Scheduling in Real-Time Embedded Systems by Jejurikar (Year: 2005).*
An Adaptive Clock Management Scheme Exploiting Instruction-Based Dynamic Timing Slack for a General-Purpose Graphics Processor Unit with Deep Pipeline and Out-of-Order Execution by Jia Feb. 2019 (Year: 2019).*
A Fast Storage Allocator (Year: 1965).*
A Preliminary Evaluation of the Critical Path Methodfor Scheduling Tasks on Multiprocessor Systems by Kohler (Year: 1974).*
The ABCs of the Critical Path Method by Levy (Year: 1963).*
Slack Assessment of the Real Time Scheduling Algorithms by Ramesh (Year: 2016).*
EXecute In Place (XIP) overview by Wilshire (Year: 2007).*
Synthesis and Optimization of Digital Circuits 1994 by Micheli (Year: 1994).*
Wikipedia: Execute in Place (Year: 2017).*
Efficient Computation of Interprocedural Definition-Use Chains by Harrold (Year: 1994).*
Slack: A New Performance Metric for Parallel Programs by Miller (Year: 1994).*
Critical Path Analysis for the Execution of Parallel and Distributed Programs (Year: 1998).*
Wikipedia: In Place Algorithm as published Feb. 23, 2019 (Year: 2019).*
Leveraging Program Analysis to Reduce User-Perceived Latency in Mobile Applications by Zhao (Year: 2018).*
Reducing the Complexity of Dataflow Graphs Using Slack-Based Merging by Ali (Year: 2017).*
Tango: a Hardware-based Data Prefetching Technique for Superscalar Processors by Pinter (Year: 1996).*
Tianqi Chen et al., "Training Deep Nets with Sublinear Memory Cost", arXiv.org > cs > arXiv: 1604.06174, Apr. 22, 2016.
Linnan Wang et al., "SuperNeurons: Dynamic GPU Memory Management for Training Deep Neural Networks", Proceedings of the 23rd ACM SIGPLAN Symposium on Principles and Practice of Parallel Programming. ACM, Jan. 2018.
Chen Meng et al., "Training Deeper Models by GPU Memory Optimization on TensorFlow", 31st Conference on Neural Information Processing Systems, Neural Information Processing Systems, Long Beach, CA, USA, Dec. 2017.
"EECS 583—Class 11, Instruction Scheduling" University of Michigan (Oct. 2011) pp. 1-25.

* cited by examiner

REDUCED MEMORY NEURAL NETWORK TRAINING

BACKGROUND

The present invention generally relates to machine learning and, more particularly, to training artificial neural networks.

An artificial neural network (ANN) is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

Referring now to FIG. 1, a generalized diagram of a neural network is shown. ANNs demonstrate an ability to derive meaning from complicated or imprecise data and can be used to extract patterns and detect trends that are too complex to be detected by humans or other computer-based systems. The structure of a neural network is known generally to have input neurons 102 that provide information to one or more "hidden" neurons 104. Connections 108 between the input neurons 102 and hidden neurons 104 are weighted and these weighted inputs are then processed by the hidden neurons 104 according to some function in the hidden neurons 104, with weighted connections 108 between the layers. There can be any number of layers of hidden neurons 104, and as well as neurons that perform different functions. There exist different neural network structures as well, such as convolutional neural network, maxout network, etc. Finally, a set of output neurons 106 accepts and processes weighted input from the last set of hidden neurons 104.

This represents a "feed-forward" computation, where information propagates from input neurons 102 to the output neurons 106. Upon completion of a feed-forward computation, the output is compared to a desired output available from training data. The error relative to the training data is then processed in "feed-back" computation, where the hidden neurons 104 and input neurons 102 receive information regarding the error propagating backward from the output neurons 106. Once the backward error propagation has been completed, weight updates are performed, with the weighted connections 108 being updated to account for the received error. This represents just one variety of ANN.

The training of an ANN, particularly one that has a large number of layers or a large number of neurons per layer, can be a memory-intensive process. When ANNs are used in devices that have limited physical resources, training the ANN can be a challenge.

SUMMARY

A method for training a neural network includes determining a graph representation of a set of neural network training operations based on definition-use chains. A memory allocation queue is determined based on a slack value for each neural network training operation in the graph representation. Memory for each neural network training operation in the memory allocation queue is allocated. Execution of neural network training operations with non-zero slack is delayed to minimize an amount of memory allocated at any one time. Neural network training is executed using the allocated memory for each neural network training operation.

A neural network computing system includes a memory allocator that has a processor configured to determine a graph representation of a set of neural network training operations based on definition-use chains, to determine a memory allocation queue based on a slack value for each neural network training operation in the graph representation, and to allocate memory for each neural network training operation in the memory allocation queue, delaying execution of neural network training operations with non-zero slack to minimize an amount of memory allocated at any one time. A training module is configured to execute neural network training using the allocated memory for each neural network training operation.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention reduce the memory needed during artificial neural network (ANN) training. In particular, the present embodiments reduce the amount of memory needed to keep the result of each operation in an ANN that has a shape and connectivity that does not change during execution. Toward this end, the present embodiments create a graph of memory usage based on a definition-use chain. A set of heuristics are used, based on the structure of the graph, to allocate memory for the ANN training operations.

Figure 1:
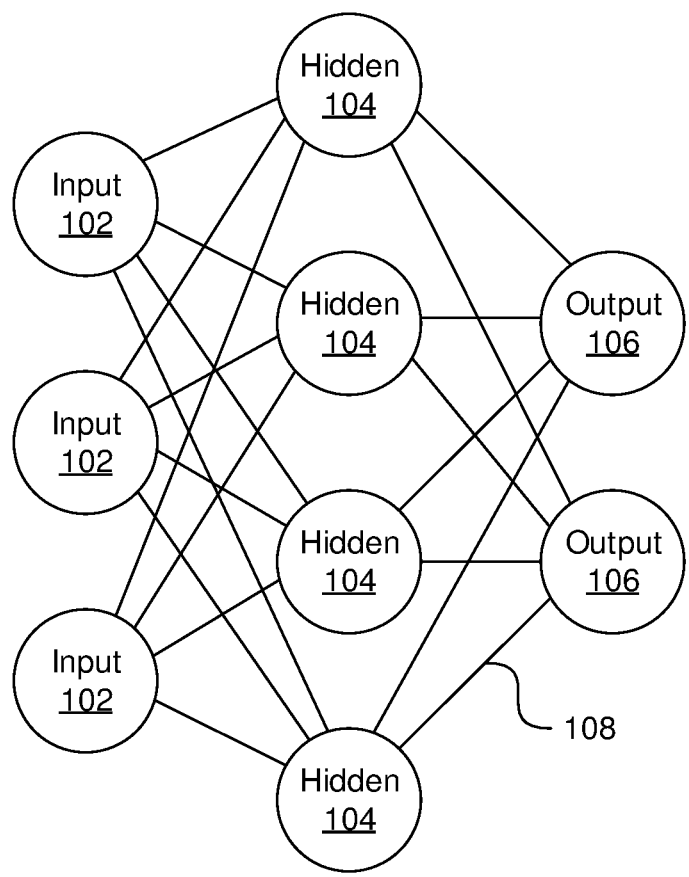
FIG. 1 is a high-level diagram of a neural network architecture.
Figure 2:
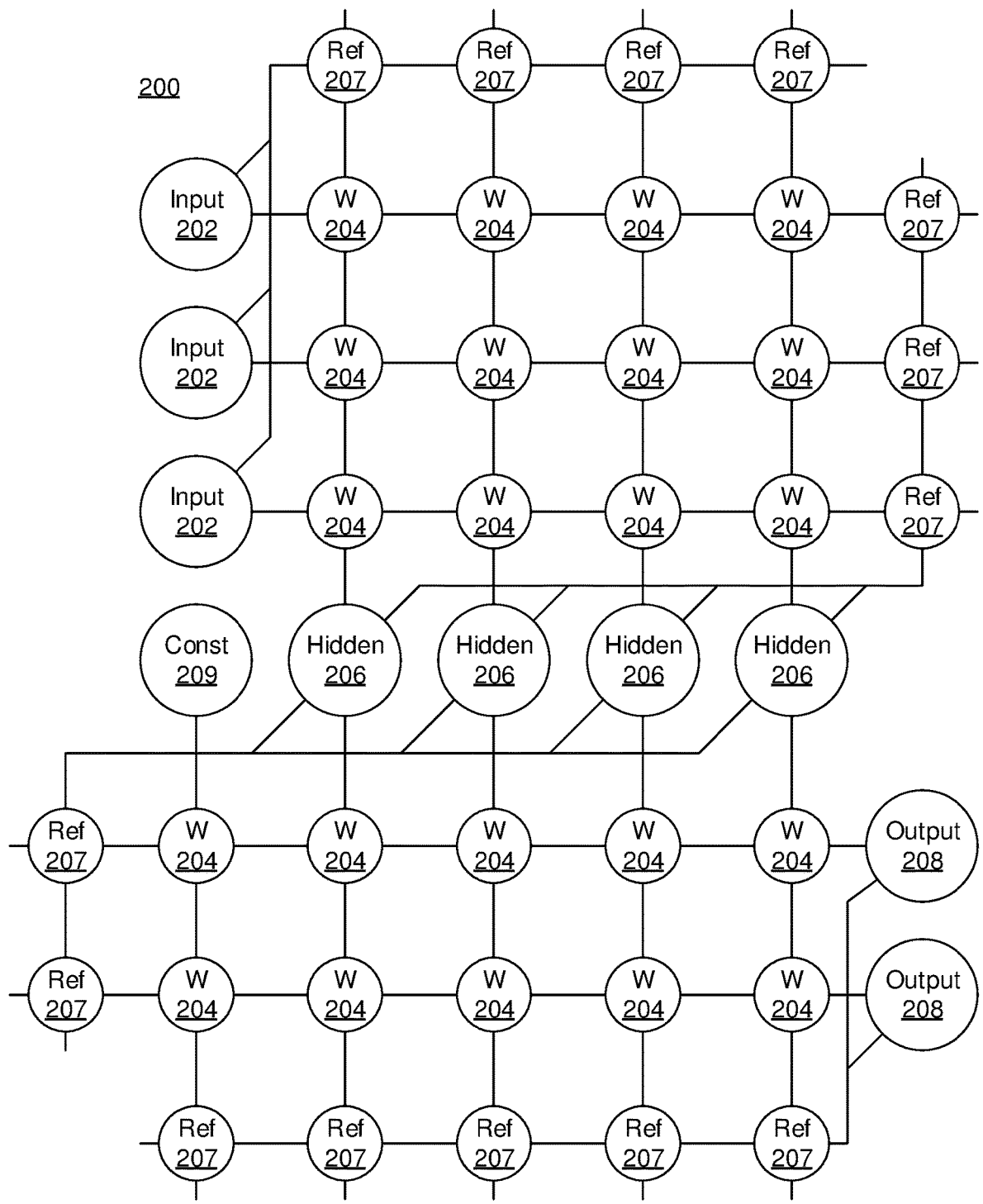
FIG. 2 is a diagram of an exemplary neural network architecture in accordance with an embodiment of the present invention.

Referring now to the drawings in which like numerals represent the same or similar elements and initially to FIG. 2, an artificial neural network (ANN) architecture 200 is shown. It should be understood that the present architecture is purely exemplary and that other architectures or types of neural network can be used instead. In particular, while a hardware embodiment of an ANN is described herein, it should be understood that neural network architectures can be implemented or simulated in software. The hardware embodiment described herein is included with the intent of illustrating general principles of neural network computation at a high level of generality and should not be construed as limiting in any way. In either case, the amount of memory needed to hold the output of operations during training can be reduced in the present embodiments.

Furthermore, the layers of neurons described below and the weights connecting them are described in a general manner and can be replaced by any type of neural network layers with any appropriate degree or type of interconnectivity. For example, layers can include convolutional layers, pooling layers, fully connected layers, stopmax layers, or any other appropriate type of neural network layer. Furthermore, layers can be added or removed as needed and the weights can be omitted for more complicated forms of interconnection.

During feed-forward operation, a set of input neurons 202 each provide an input voltage in parallel to a respective row of weights 204. In the hardware embodiment described herein, the weights 204 each have a settable resistance value, such that a current output flows from the weight 204 to a respective hidden neuron 206 to represent the weighted input. In software embodiments, the weights 204 can simply be represented as coefficient values that are multiplied against the relevant neuron outputs.

Following the hardware embodiment, the current output by a given weight 204 is determined as $$I = \frac{V}{r},$$

where V is the input voltage from the input neuron 202 and r is the set resistance of the weight 204. The current from each weight adds column-wise and flows to a hidden neuron 206. A set of reference weights 207 have a fixed resistance and combine their outputs into a reference current that is provided to each of the hidden neurons 206. Because conductance values can only be positive numbers, some reference conductance is needed to encode both positive and negative values in the matrix. The currents produced by the weights 204 are continuously valued and positive, and therefore the reference weights 207 are used to provide a reference current, above which currents are considered to have positive values and below which currents are considered to have negative values. The use of reference weights 207 is not needed in software embodiments, where the values of outputs and weights can be precisely and directly obtained. As an alternative to using the reference weights 207, another embodiment can use separate arrays of weights 204 to capture negative values.

The hidden neurons 206 use the currents from the array of weights 204 and the reference weights 207 to perform some calculation. The hidden neurons 206 then output a voltage of their own to another array of weights 204. This array performs in the same way, with a column of weights 204 receiving a voltage from their respective hidden neuron 206 to produce a weighted current output that adds row-wise and is provided to the output neuron 208.

It should be understood that any number of these stages can be implemented, by interposing additional layers of arrays and hidden neurons 206. It should also be noted that some neurons can be constant neurons 209, which provide a constant output to the array. The constant neurons 209 can be present among the input neurons 202 and/or hidden neurons 206 and are only used during feed-forward operation.

During back propagation, the output neurons 208 provide a voltage back across the array of weights 204. The output layer compares the generated network response to training data and computes an error. The error is applied to the array as a voltage pulse, where the height and/or duration of the pulse is modulated proportional to the error value. In this example, a row of weights 204 receives a voltage from a respective output neuron 208 in parallel and converts that voltage into a current which adds column-wise to provide an input to hidden neurons 206. The hidden neurons 206 combine the weighted feedback signal with a derivative of its feed-forward calculation and stores an error value before outputting a feedback signal voltage to its respective column of weights 204. This back propagation travels through the entire network 200 until all hidden neurons 206 and the input neurons 202 have stored an error value.

During weight updates, the input neurons 202 and hidden neurons 206 apply a first weight update voltage forward and the output neurons 208 and hidden neurons 206 apply a second weight update voltage backward through the network 200. The combinations of these voltages create a state change within each weight 204, causing the weight 204 to take on a new resistance value. In this manner the weights 204 can be trained to adapt the neural network 200 to errors in its processing. It should be noted that the three modes of operation, feed forward, back propagation, and weight update, do not overlap with one another.

As noted above, the weights 204 can be implemented in software or in hardware, for example using relatively complicated weighting circuitry or using resistive cross point devices. Such resistive devices can have switching characteristics that have a non-linearity that can be used for processing data. The weights 204 can belong to a class of device called a resistive processing unit (RPU), because their non-linear characteristics are used to perform calculations in the neural network 200. The RPU devices can be implemented with resistive random access memory (RRAM), phase change memory (PCM), programmable metallization cell (PMC) memory, or any other device that has non-linear resistive switching characteristics. Such RPU devices can also be considered as memresistive systems.

Figure 3:
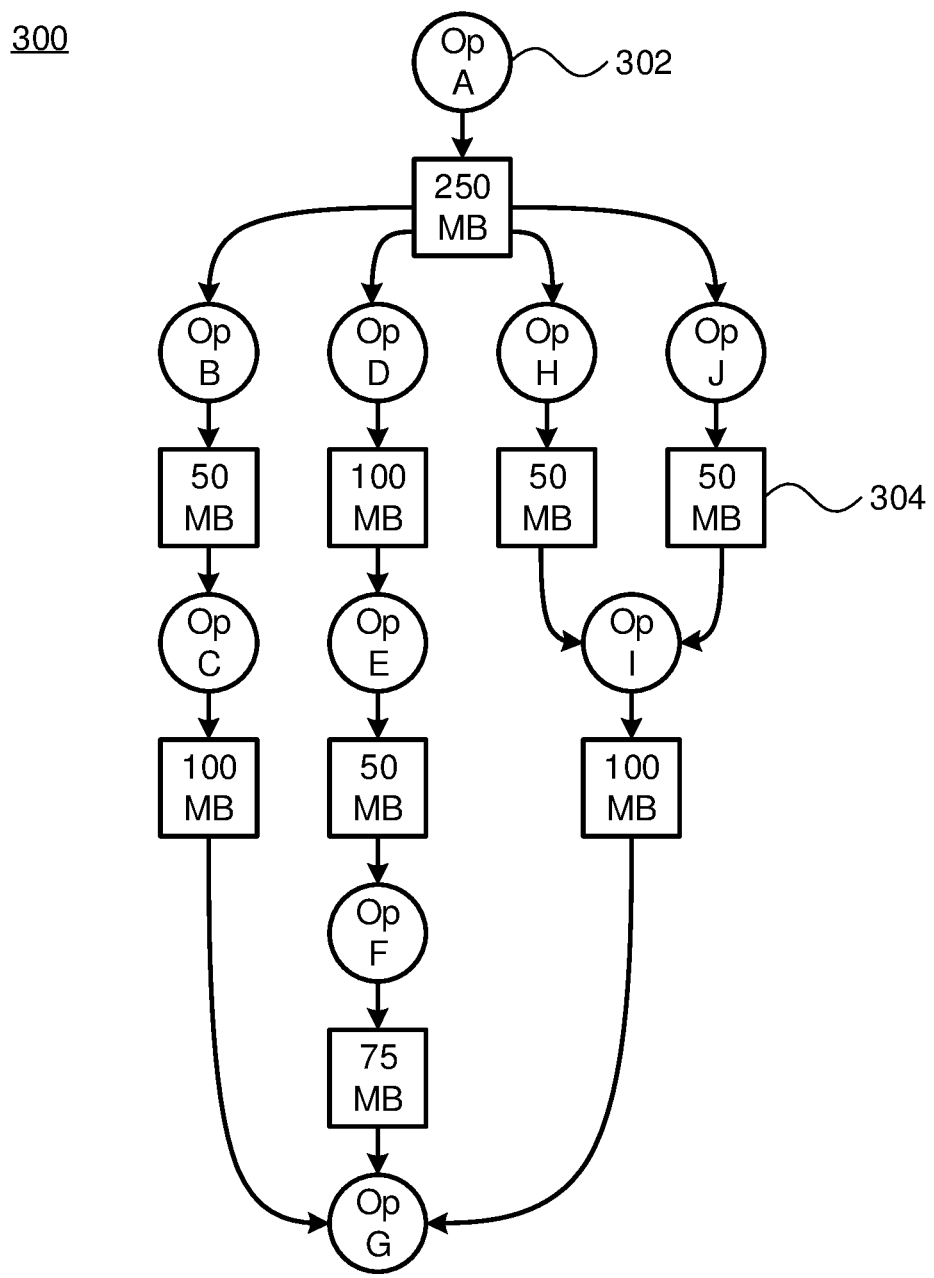
FIG. 3 is a graph diagram illustrating an order of training operations for an exemplary neural network training process in accordance with an embodiment of the present invention.

Referring now to FIG. 3, a representation 300 of an ANN training process is shown. Each operation node 302 performs some phase of training the neural network. For example, an operation node 302 may represent a layer or a portion of a layer that is trained based on a shared set of inputs. The output of an operation node 302 can be stored in a set of memory, represented by a memory node 304. In this case, the operation nodes 302 are labeled with names to distinguish them from one another, while the memory nodes 304 are labeled with a memory capacity that represents the amount of memory needed to store the output of a particular operation node 302. The output stored in a single memory node 304 can be used by multiple downstream operation nodes 302 and a single operation node 304 can use the information stored in multiple distinct memory nodes 304.

Thus, for example, an initial operation A is performed and generates an output that is 250 MB in size. Four different operations, B, D, H, and J, all use the information stored in that 250 MB, for example each handling a different subset of the output. Each of operations B, D, H, and J have corresponding output memory nodes with appropriate respective sizes. Processing continues in this manner until reaching operation G, which completes the round of training.

A queue can be formed from this graph to represent the different memory usages. Following the above example, the queue may be represented as:

C→G (100 MB)
B→C (50 MB)
J→I (50 MB)
I→G (100 MB)
H→I (50 MB)
F→G (75 MB)
E→F (50 MB)
D→E (100 MB)
A→BDHJ (250 MB)

Each entry in the queue identifies an originating operation and one or more target operations. The output of the originating operation is stored in a memory having the associated size, which is then accessed as an input to the target operation.

Figure 4:
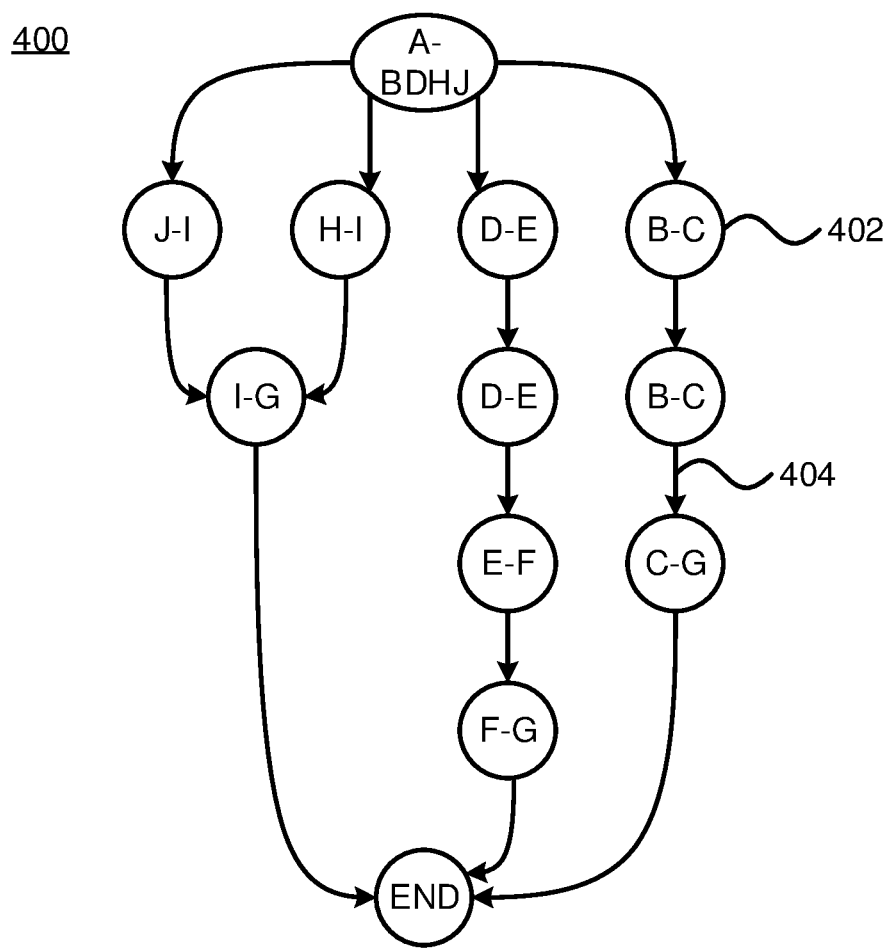
FIG. 4 is a graph diagram illustrating an order of memory allocations based on definition-use chains for the exemplary neural network training process in accordance with an embodiment of the present invention.

Referring now to FIG. 4, an example of a definition-use style representation 400 of the neural network training process of FIG. 3 is shown. The nodes 402 of this representation 400 indicate transitions between operations, for example with operation A transitioning to operations B, D, H, and J. Each edge 404 in the graph representation identifies a use by the second operation of output generated by the first operation. Thus, for example, the node J-I follows A-BDHJ, indicating that the input used by J-I is based at least in part on the output generated by A-BDHJ.

A definition-use chain can be built by first creating nodes that merge multiple nodes in the original graph that share the same memory and then connecting two nodes that share the same operation by an edge. The resulting graph can be used to determine the order in which memory is to be allocated.

Figure 5:
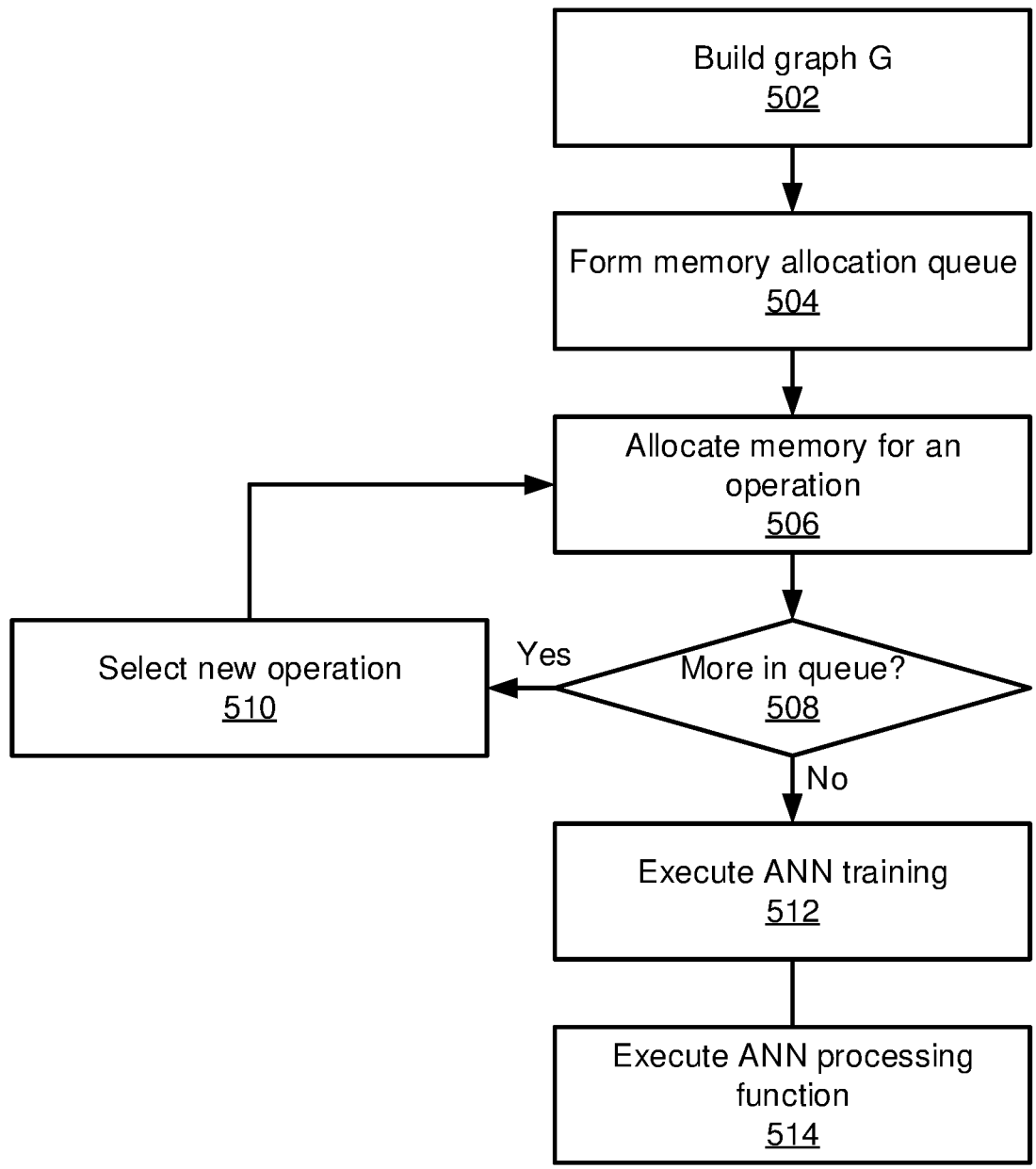
FIG. 5 is a block/flow diagram of a process for training and execution of a neural network processing function in accordance with an embodiment of the present invention.

Referring now to FIG. 5, a method for allocating memory for ANN training is shown. Block 502 builds a graph G that represents the memory usage of training operations based on recorded memory usage and execution times for each operation. Using this graph, block 504 creates a queue of memory allocations, responsive to a set of heuristics that are described in greater detail below. This queue establishes an allocation priority.

Block 506 allocates memory for a first operation in the queue. Block 508 determines whether operations remain in the queue. If so, block 510 selects a next operation from the queue. The particular steps taken in block 506 to allocate memory depend on the type of memory allocation determined by the heuristics in block 504. Once all of the operations have been allocated their respective memories, block 512 executes training for the ANN. After training is complete, block 514 executes a neural network processing function using the trained weights.

Figure 6:
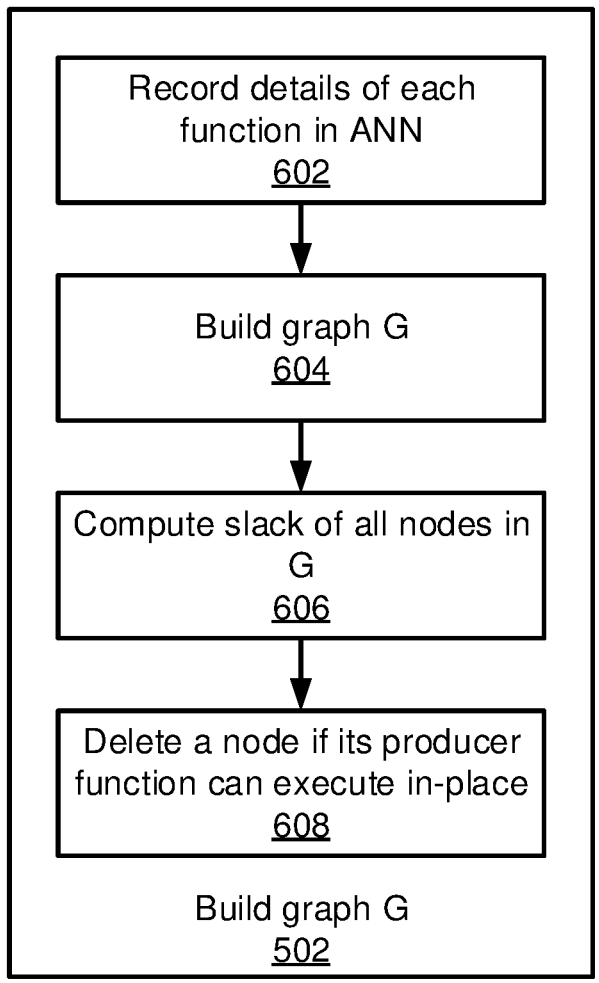
FIG. 6 is a block/flow diagram of a process for forming a graph representation of a neural network training process in accordance with an embodiment of the present invention.

Referring now to FIG. 6, additional detail is provided regarding the formation of the graph in block 502. Block 602 first records memory usage and execution time for each operation during a first iteration of the training. It should be noted that, although the first execution uses full memory, subsequent executions can reduce memory usage, making it possible to optimize the runtime operations. For example, a more efficient convolution operator can be selected if the amount of memory being used is smaller. Thus, memory optimization enables runtime selection of efficient processes. As an alternative to recording memory usage and execution time during the first iteration of training, this step can be performed during an inference step, with the recorded timing statistics being usable across multiple inferences.

Block 604 builds the graph G, where each node is a memory allocation that holds an output of a training operation and each edge connects two nodes that share the memory, whether as a producer or consumer, in the ANN.

Block 606 computes the slack of all the nodes in G. Slack is a measure of scheduling freedom, where a higher degree of slack indicates a greater amount of scheduling mobility. If a node has zero slack, then it cannot be delayed without delaying the entire schedule. Slack can be determined for each node by calculating the deadline time d and the earliest execution time e, with c being defined as the execution time of the node. The slack time s is then defined as $s=(d-e)-c$. The execution time is determined using the recorded start and run times of the operations.

Block 608 deletes any node g in the graph G if the operation that produces the data in g can execute its function in-place, such that the memory allocation need not change. An example of such an operation would be a rectified linear unit. Upon deletion of a node by block 608, the preceding and following nodes are connected to one another by an edge.

Figure 7:
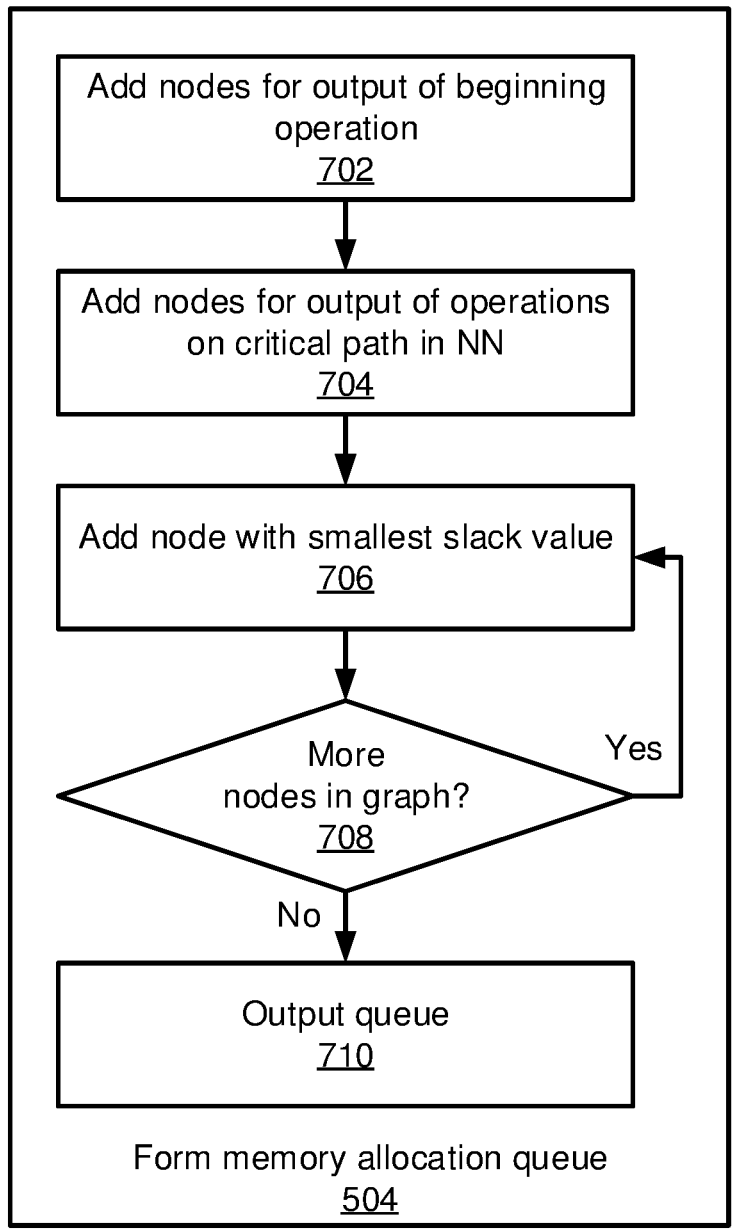
FIG. 7 is a block/flow diagram of a process for forming a memory allocation queue in accordance with an embodiment of the present invention.

Referring now to FIG. 7, additional detail is provided regarding the formation of the memory allocation queue in block 504. Block 702 first adds entries to the queue corresponding to nodes that represent the memory allocation for the output of a first operation in an ANN's training process. Block 702 then deletes the node(s) from the graph G. Block 704 adds entries to the queue corresponding to nodes that represent the memory allocation for nodes on a critical path in the neural network between the first operation and a final operation, where a critical path is defined by operations that have zero slack. Block 704 then deletes the node(s) from the graph G.

Block 706 identifies a node remaining in G that has a smallest slack value and adds it to the queue, deleting the node from G. Block 708 determines whether any nodes remain in G. If so, processing returns to block 706 and repeats until all of the nodes have been removed from G, at which time block 710 outputs the completed queue.

Figure 8:
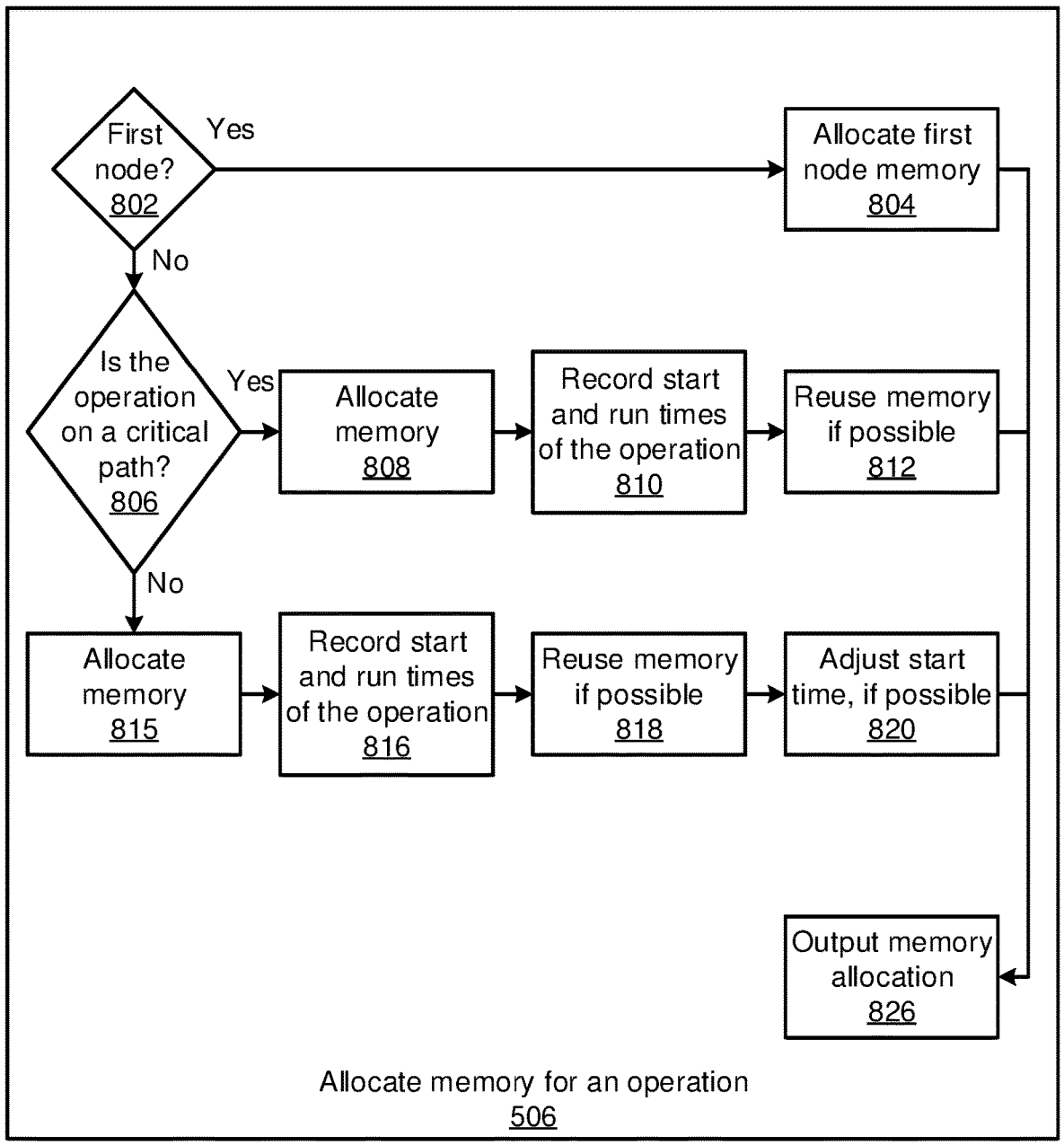
FIG. 8 is a block/flow diagram of a process for allocating memory for a neural network training operation in accordance with an embodiment of the present invention.

Referring now to FIG. 8, additional detail is provided regarding the allocation of memory for an operation in block 506. Block 802 determines whether the operation/node being processed represents the first operation in the training process. If so, block 804 allocates memory for the first operation. If not, block 806 determines whether the operation/node being processed is on a critical path (e.g., if it has no slack).

For a critical path node, block 808 first allocates memory for the node and block 810 records the start time and run time of the allocated memory. If there is a memory that is not used by nodes connected to the node being processed, block 812 reuses memory from a previous operation in the graph. If there is a block of previously allocated memory that is larger than is needed for the node being processed, block 812 splits the block of memory and reuses the needed portion.

If the operation/node is not on a critical path (e.g., has at least some slack), block 815 first allocates memory for the block and block 816 records the start and run time of the allocated memory. If there is a memory that is not used by nodes connected to the node being processed, block 818 reuses memory from a previous operation in the graph. If there is a block of previously allocated memory that is larger than is needed for the node in question, block 818 splits the block of memory and reuses the needed portion. Block 820 determines whether it is possible to adjust the start time (e.g., delaying execution) of the operation in the neural network training to time the operation such that the minimum amount of memory is needed at each time step and to allocate the memory alongside an operation with a longer execution time. The present embodiments attempt to time the performance of a node to minimize the total amount of memory needed at any time, co-locating nodes to functions with longer execution times. This change can change the lifetime of a memory allocation, so that the lifetime statistics are updated. Once the memory allocation for the node has been determined, block 826 outputs the memory allocation.

The present embodiments contemplate at least two different measurements for the lifetime of a memory allocation. In one embodiment, the lifetime of a memory allocation is measured from the end of one function to the end of a next function. In another embodiment, the lifetime of a memory allocation is measured from the beginning of one function to the end of the next function.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 9:
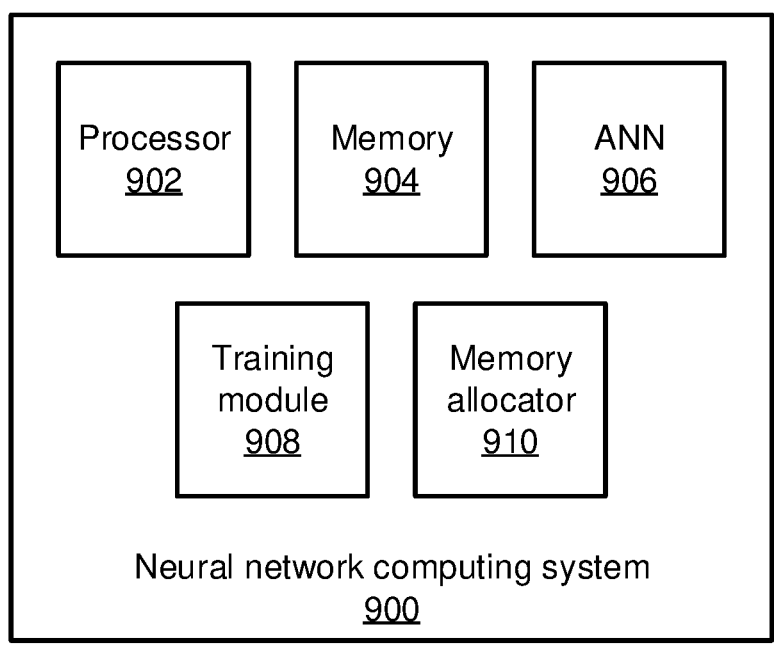
FIG. 9 is a block diagram of a neural network computing system in accordance with an embodiment of the present invention.

Referring now to FIG. 9, a neural network computing system 900 is shown. The system 900 includes a hardware processor 902 and a memory 904. An ANN 906 is implemented in either hardware, software, or a combination of the two. The system 900 further includes one or more functional modules. Each of the functional modules can be implemented in the form of software that is stored in memory 904 and executed by processor 902. In alternative embodiments, one or more of the functional modules can be implemented as one or more discrete hardware components in the form of, e.g., application-specific integrated chips or field programmable gate arrays.

A training module 908 trains the ANN using a set of training data. In some exemplary embodiments, the training process is an iterative process that trains the ANN using a first portion of the training data and then checks the results using a second portion of the training data. Discrepancies between the output of the ANN 906 and an expected output are used in the next training iteration to adjust the parameters of the ANN 906. At each iteration, a set of different operations are performed as part of the training process, and memory allocator 910 determines how to allocate memory to each operation and how to order the operations to decrease overall memory usage.

Figure 10:
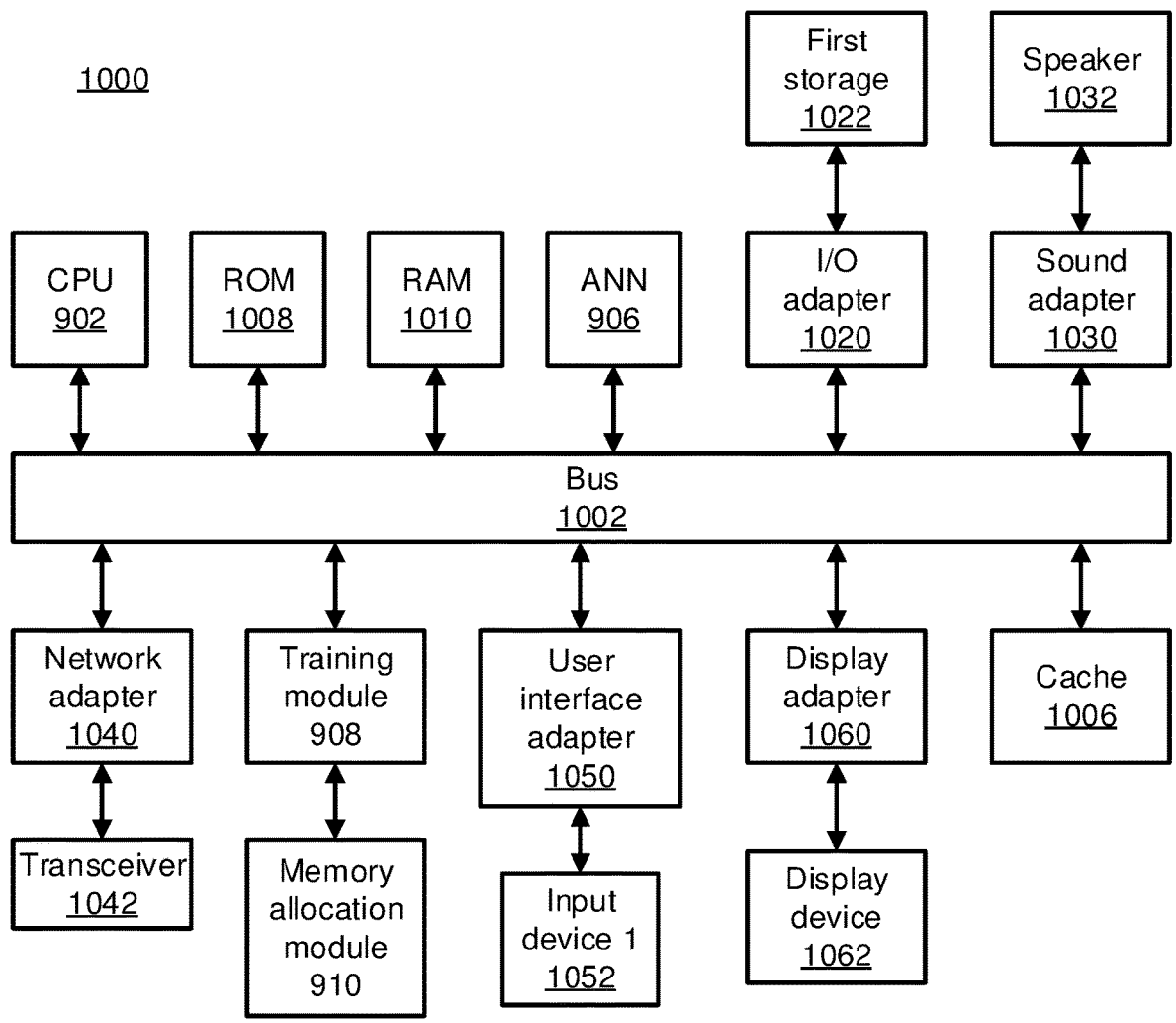
FIG. 10 is a block diagram of a processing system in accordance with an embodiment of the present invention.
Figure 11:
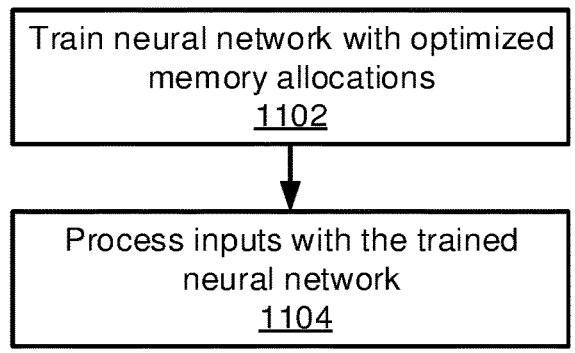
FIG. 11 is a block/flow diagram of a method for performing data processing using a trained neural network in accordance with an embodiment of the present invention.

Referring now to FIG. 10, an exemplary processing system 1000 is shown which may represent the neural network computing system 900. The processing system 1000 includes at least one processor (CPU) 902 operatively coupled to other components via a system bus 1002. A cache 1006, a Read Only Memory (ROM) 1008, a Random Access Memory (RAM) 1010, an input/output (I/O) adapter 1020, a sound adapter 1030, a network adapter 1040, a user interface adapter 1050, and a display adapter 1060, are operatively coupled to the system bus 1002, along with ANN 906 and training module 908.

A first storage device 1022 is operatively coupled to system bus 1002 by the I/O adapter 1020. The storage device 1022 can be any of a disk storage device (e.g., a magnetic or optical disk storage device), a solid state magnetic device, and so forth. The storage device 1022 can be the same type of storage device or different types of storage devices.

A speaker 1032 is operatively coupled to system bus 1002 by the sound adapter 1030. A transceiver 1042 is operatively coupled to system bus 1002 by network adapter 1040. A display device 1062 is operatively coupled to system bus 1002 by display adapter 1060.

A first user input device 1052 is operatively coupled to system bus 1002 by user interface adapter 1050. The user input device 1052 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input device is used to input and output information to and from system 1000.

Of course, the processing system 1000 may also include other elements (not shown), as readily contemplated by one of skill in the art, as well as omit certain elements. For example, various other input devices and/or output devices can be included in processing system 1000, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 1000 are readily contemplated by one of ordinary skill in the art given the teachings of the present principles provided herein.

Having described preferred embodiments of reduced memory neural network training (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for training a neural network, comprising:
determining a graph representation of a set of neural network training operations that include one or more definition use chains, including building the graph representation based on an original graph representation, where at least one node in the graph representation merges multiple nodes in the original graph representation that share the same memory, and where at least two nodes that share a same operation are connected by an edge;
adding neural network training operations to a memory allocation queue based on a slack value for each neural network training operation in the graph representation;
allocating memory for each neural network training operation in the memory allocation queue using a processor device, delaying execution of neural network training operations with non-zero slack to minimize an amount of memory allocated at any one time; and
executing neural network training using the allocated memory for each neural network training operation.

2. The method of claim 1, wherein allocating memory comprises allocating memory for critical path neural network training operations before neural network training operations that have non-zero slack.

3. The method of claim 1, wherein allocating memory comprises allocating memory for neural network training operations in order of increasing slack.

4. The method of claim 1, wherein slack is a measure of how much a neural network training operation can be delayed without delaying overall training execution.

5. The method of claim 1, wherein building the graph representation omits neural network training operations that can execute in-place, such that a memory allocation need not change.

6. The method of claim 1, wherein allocating memory for each neural network training operation comprises reusing memory allocated to a previous neural network training operation for a later neural network training operation.

7. The method of claim 6, wherein reusing memory comprises splitting a previous memory allocation that is larger than needed for the later neural network training operation and using a portion of the split previous memory allocation for the later neural network training operation.

8. The method of claim 1, further comprising recording start and run times of each neural network training operation during a first iteration of training.

9. The method of claim 8, further comprising determining a slack value for each neural network training operation based on the recorded start and run times.

10. A non-transitory computer readable storage medium comprising a computer readable program for training a neural network, wherein the computer readable program when executed on a computer causes the computer to perform the steps of:
determining a graph representation of a set of neural network training operations that include one or more definition use chains, including building the graph representation based on an original graph representation, where at least one node in the graph representation merges multiple nodes in the original graph representation that share the same memory, and where at least two nodes that share a same operation are connected by an edge;
adding neural network training operations to a memory allocation queue based on a slack value for each neural network training operation in the graph representation;
allocating memory for each neural network training operation in the memory allocation queue using a processor device, delaying execution of neural network training operations with non-zero slack to minimize an amount of memory allocated at any one time; and
executing neural network training using the allocated memory for each neural network training operation.

11. A neural network computing system, comprising:
a memory allocator comprising a processor configured to determine a graph representation of a set of neural network training operations that include one or more definition use chains, where the graph representation is based on an original graph representation, where at least one node in the graph representation merges multiple nodes in the original graph representation that share the same memory, and where at least two nodes that share a same operation are connected by an edge, to add neural network training operations to a memory allocation queue based on a slack value for each neural network training operation in the graph representation, and to allocate memory for each neural network training operation in the memory allocation queue, delaying execution of neural network training operations with non-zero slack to minimize an amount of memory allocated at any one time; and
a training module configured to execute neural network training using the allocated memory for each neural network training operation.

12. The system of claim 11, wherein the memory allocator is further configured to allocate memory for critical path neural network training operations before neural network training operations that have non-zero slack.

13. The system of claim 11, wherein the memory allocator is further configured to allocate memory for neural network training operations in order of increasing slack.

14. The system of claim 11, wherein slack is a measure of how much a neural network training operation can be delayed without delaying overall training execution.

15. The system of claim 11, wherein the memory allocator is further configured to omit neural network training operations that can execute in-place when building the graph representation, such that a memory allocation need not change.

16. The system of claim 11, building the graph representation reuse memory allocated to a previous neural network training operation for a later neural network training operation.

17. The system of claim 16, building the graph representation split a previous memory allocation that is larger than needed for the later neural network training operation and to use a portion of the split previous memory allocation for the later neural network training operation.

18. The system of claim 11, wherein the training module is further configured to record start and run times of each neural network training operation during a first iteration of training.

19. The system of claim 18, building the graph representation determine a slack value for each neural network training operation based on the recorded start and run times.

* * * * *